US012097513B2

(12) United States Patent
Xu et al.

(10) Patent No.: US 12,097,513 B2
(45) Date of Patent: Sep. 24, 2024

(54) ENERGY SAVING DYNAMIC EFFLUENT SPRINKLER

(71) Applicant: Xiamen EASO Co., Ltd., Xiamen (CN)

(72) Inventors: Hua Shan Xu, Xiamen (CN); Hai Tao Lu, Xiamen (CN); Rui Fang Du, Xiamen (CN); Zhen Li, Xiamen (CN)

(73) Assignee: Xiamen EASO Co., Ltd., Xiamen (CN)

( * ) Notice: Subject to any disclaimer, the term of this patent is extended or adjusted under 35 U.S.C. 154(b) by 176 days.

(21) Appl. No.: 17/308,901

(22) Filed: May 5, 2021

(65) Prior Publication Data

US 2022/0203385 A1 Jun. 30, 2022

(30) Foreign Application Priority Data

Dec. 24, 2020 (CN) ......................... 202023170070.1

(51) Int. Cl.
*B05B 1/18* (2006.01)
*B05B 3/04* (2006.01)

(52) U.S. Cl.
CPC ................ *B05B 1/18* (2013.01); *B05B 3/044* (2013.01)

(58) Field of Classification Search
CPC ......... B05B 1/18; B05B 3/044; B05B 15/654; B05B 3/04; B05B 1/185
See application file for complete search history.

(56) References Cited

U.S. PATENT DOCUMENTS

| | | | | |
|---|---|---|---|---|
| 6,568,603 B2 * | 5/2003 | Chao | B05B 1/20 | 239/548 |
| 2022/0062927 A1 * | 3/2022 | Hofman | B05B 3/16 | |

FOREIGN PATENT DOCUMENTS

| | | |
|---|---|---|
| CN | 109746133 | * 12/2018 |
| CN | 109746133 A1 | * 5/2019 |
| CN | 112827677 A | * 11/2019 |

OTHER PUBLICATIONS

English translation of CN 109746133 (Year: 2018).*

* cited by examiner

*Primary Examiner* — Qingzhang Zhou
*Assistant Examiner* — Joel Zhou
(74) *Attorney, Agent, or Firm* — Jose Cherson Weissbrot

(57) ABSTRACT

The utility model is realized through the following technical scheme: an energy saving dynamic effluent sprinkler, comprises a shell, a water inlet seat, a water outlet device and a water outlet cover, the water outlet device is arranged in the shell, the water outlet cover is connected with the shell, and the water outlet cover is provided with a water outlet hole; Among them, the water outlet device comprises a base, an inclined water body, a swing water component, an impeller component and a driving component, the inclined water body is connected with the base to form a cavity, the cavity has a water outlet, the impeller component is arranged in the cavity, driven by the impeller component, the driving component can drive the swing water component to swing back and forth; The swing water component is mounted on the base and can swing in the base, the swing component is provided with a water passing chamber, the side surface of the swing component is provided with a water passing outlet, he water outlet is communicated with water passing outlet through a communication channel, and the swing water component is communicated with the water outlet hole. The utility model relates to an energy-saving dynamic water outlet sprinkler of the utility model has a larger shower range under the same water outlet area, can play a good water-saving effect; at the same time, the swing sprinkler has a sweeping impact massage feeling and strong ornamental, and can bring users a comfortable shower experience.

5 Claims, 4 Drawing Sheets

ENERGY SAVING DYNAMIC EFFLUENT SPRINKLER

BACKGROUND OF THE INVENTION

1. Technical Field

The utility model relates to an energy saving dynamic effluent sprinkler

2. Description of Related Art

With the increasing shortage of global water resources, water-saving and environmental protection products have gradually become the mainstream trend of consumption. There are many types of water-saving products in the market, which mainly reduce the How by adding a How limiter at the inlet end, but in this way, the number of outlets remains unchanged, and the flow decreases, resulting in weak water spray and poor shower effect; if the flow is reduced at the same time, the number of outlets decreases, resulting in small coverage and sparse water spray.

Most of the existing massage sprinklers on the market are: through the impeller rotation to cover the outlet hole regularly, so that the water effect can reach the gap water, when the shower is used, there is a pulse feeling on the human body, so as to achieve the massage effect, but this pulse feeling is not very obvious.

BRIEF SUMMARY OF THE INVENTION

To overcome the defects mentioned above. The purpose of the utility model is to provide an energy saving dynamic effluent sprinkler.

The utility model is realized through the following technical scheme: an energy saving dynamic effluent sprinkler, comprises a shell, a water inlet seat, a water outlet device and a water outlet cover, the water outlet device is arranged in the shell, the water outlet cover is connected with the shell, and the water outlet cover is provided with a water outlet hole; Among them, the water outlet device comprises a base, an inclined water body, a swing water component, an impeller component and a driving component, the inclined water body is connected with the base to form a cavity, the cavity has a water outlet, the impeller component is arranged in the cavity, driven by the impeller component, the driving component can drive the swing water component to swing back and forth; The swing water component is mounted on the base and can swing in the base, the swing component is provided with a water passing chamber, the side surface of the swing component is provided with a water passing outlet, he water outlet is communicated with water passing outlet through a communication channel, and the swing water component is communicated with the w ater outlet hole.

Furthermore, the plane where water passing outlet and the water outlet are located is nonparallel.

Furthermore, the swing water component comprises a swing surface cover and a swing water nozzle, the swing surface cover and the swing water nozzle are mutually sealed and fixed to form the water passing chamber, the swing water nozzle is communicated with the water outlet.

Furthermore, the driving component comprises a gear and an eccentric shaft, the gear is meshed with the impeller component, the bottom end of the eccentric shaft is provided with a convex column; the upper surface of the swing surface cover is provided with a chute, the convex column is matched with the chute to drive the swing water component to swing back and forth.

Furthermore, the outer side of the water passing outlet is sheathed with a special-shaped scaling ring.

Furthermore, the special-shaped sealing ring is a special-shaped O-ring.

Furthermore, the water outlet hole at least includes a first water outlet hole and a second water outlet hole, and the first water outlet hole is communicated with the water passing chamber.

Furthermore, one end of the swing water component with the water outlet is connected with the hose, and the other end is fixed on the base by a fixing plug.

Furthermore, the cavity is located above the swing water component, and the water passing outlet is arranged on the side of the swing water component.

Furthermore, the connecting channel is an inclined channel.

Compared with the prior art, the energy-saving dynamic water outlet sprinkler of the utility model has a larger shower range under the same water outlet area, and can play a good water-saving effect; at the same time, the swing sprinkler has a sweeping impact massage feeling and strong ornamental, and can bring users a comfortable shower experience; in addition, the cavity and the water outlet of the water passing outlet device of the energy-saving dynamic water outlet sprinkler of the utility model The connection between them is not up and down, and a special-shaped scaling ring is set at the water outlet. The setting direction of the special-shaped sealing ring is consistent with the swing direction of the swing water component, which can greatly reduce the risk of water leakage and has strong reliability.

BRIEF DESCRIPTION OF THE SEVERAL VIEWS OF THE DRAWINGS

In order to more clearly illustrate the technical solution of the utility model, the following will briefly introduce the embodiments or the drawings needed in the description of the prior art. It is obvious that the drawings in the following description are only some embodiments of the utility model, and for ordinary technicians in the art, they can also be obtained from these drawings without paying creative work Other figures are given.

DETAILED DESCRIPTION OF THE INVENTION

Figure 1:
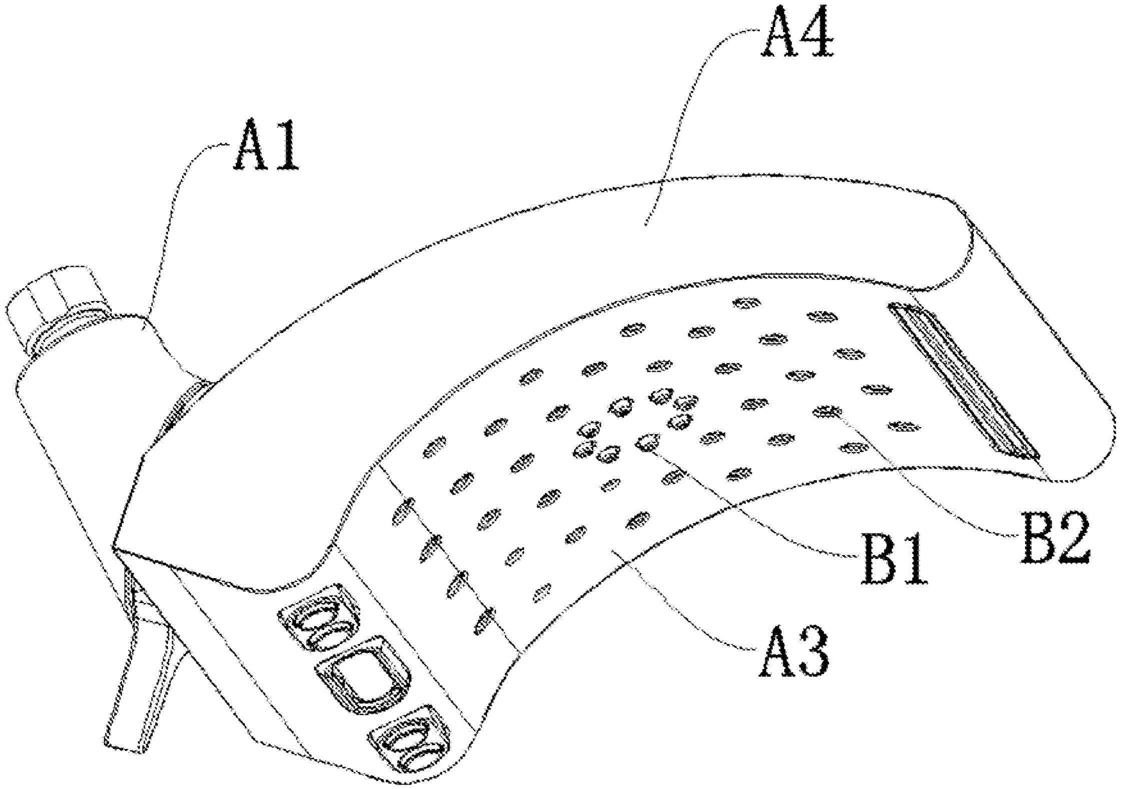
FIG. 1 is a stereogram of the utility model.
Figure 2:
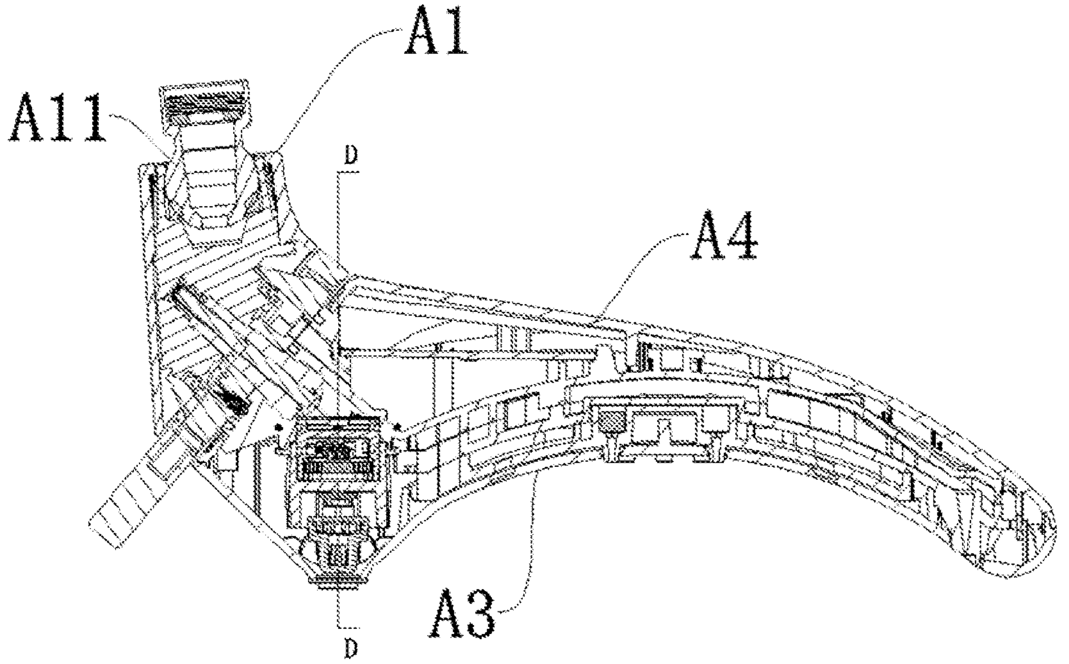
FIG. 2 is a sectional view of the utility model.

The technical scheme in the embodiment of the utility model will be described clearly and completely in combination with the drawings in the embodiment of the utility model. Obviously, the described embodiment is only a part of the embodiment of the utility model, not all the embodiments. Based on the embodiment of the utility model, all other embodiments obtained by ordinary technicians in the art without making creative work belong to the protection scope of the utility model.

As is shown in FIG. 1 to FIG. 7, an energy saving dynamic effluent sprinkler, comprises a water inlet seat A1, a water outlet device A2, a water outlet cover A3 and a shell A4, the water outlet device A2 is arranged in the shell A4, a ball valve A11 is arranged in the water inlet seat A1, and the ball valve A11 is connected with the inclined water body 2 in the water outlet device A2; the water outlet cover A3 is connected with the lower end of the shell A4, and the water outlet cover A3 is provided with a first water outlet hole B1 and a second water outlet hole B2, the first water outlet hole B1 is connected with the swing water component 3 of the water outlet device to form a swing water flower. During the swing process, the swing water component 3 is connected with one or wine of the first water outlet holes B1, and then the water is discharged in batches to form a regular swing water flower; the second water outlet hole B2 can be any form of water spray.

Specifically, refer to FIG. 3 to FIG. 7, the water outlet device A2 comprises a base 1, an inclined water body 2, a swing water component 3, an impeller component 4 and a driving component 5, the inclined water body 2 is connected with the base 1 to form a cavity a1, a scaling ring b1 is sheathed between the inclined water body 2 and the base 1 to ensure the tightness of the connection. The impeller component 4 is arranged in the cavity A1, and the inclined water body 2 is provided with an inclined water hole, which can impact the impeller assembly 4 and drive the impeller assembly to rotate when the water flow enters from the inclined water hole.

The swing water component 3 comprises a swing surface cover 31 and a swing water nozzle 32. The swing surface cover 31 and the swing water nozzle 32 are sealed and connected to form a water passing chamber a2. The upper surface of the swing surface cover 31 away from the water passing chamber a2 is provided with a chute 311, the side of the swing water component 3 is also provided with a water outlet c1, which is connected with the water passing chamber a2. A special-shaped sealing ring b2 is arranged between the outer side of the water outlet C1 and the base 1, the direction of the special-shaped scaling ring B2 is consistent with the swing direction of the swing water component, preferably, the special-shaped scaling ring B2 is a special-shaped O-ring; The connection between the water outlet a21 and the water passing outlet c1 of the cavity a1 is not positive to the upper and lower connection, the water outlet c1 is arranged on the side of the swing water component 3, the cavity a1 is located above the swing water assembly 3, a communication channel a2 is arranged between the cavity a1 and the water outlet c1 for intercommunication, that is, the water outlet a21 of the cavity a1 and the water outlet c1 are not directly opposite to each other, the center lines of the water outlet A21 and the water outlet c1 are set in a non parallel manner, and there is an included angle between them, or the plane where the water outlet and the water outlet are located has an included angle but not parallel, this design method makes the special-shaped sealing ring b2 used in the above structure a small diameter special-shaped scaling ring, and its direction is consistent with the swine direction, it can greatly reduce the risk of water leakage between components and improve the service life of each component. Preferably, the connecting channel a2 is an inclined channel, which connects the water outlet c1 on the side of the swing water assembly with the cavity a1 to ensure the sealing performance of the connection between the components. Furthermore, the water outlet end of the swing water component 3 is sealed and connected with the base 1, and the other end of the swing water component is fixed in the base 1 by the fixing plug 6, the swing water component 3 can swing in the base 1; Specifically, the fixing plug 6 has a receiving cavity 61 and a locking hole 62, the swing water component 3 extends into the holding cavity 61, and a screw 63 successively passes through the locking hole 62 and the base 1, thereby fixing the swing water component to the base 1.

Figure 7:
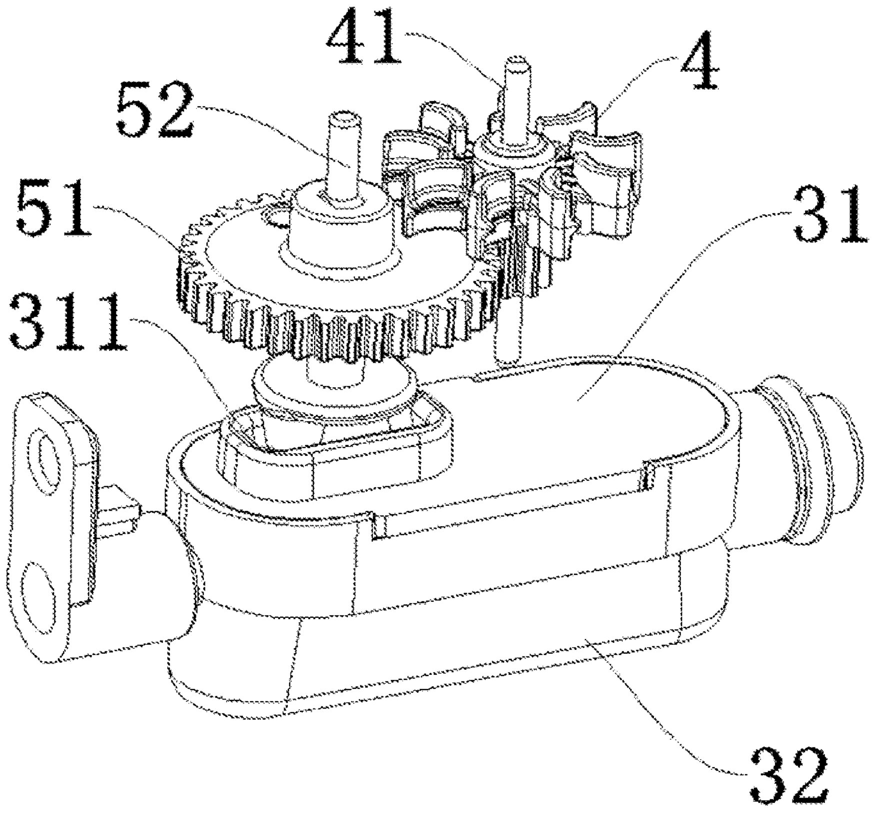
FIG. 7 is a partial three-dimensional schematic diagram of the utility model.

Specifically, refer to FIG. 7, the center of the impeller component 4 uses a pin 41 to install the impeller component 4 in the cavity a1, one end of the pin 41 is installed on the inclined water body 2, and the other end is installed on the base 1, the impeller component 4 can rotate around the pin 41 under the impact of the water flowing into the inclined water hole. The driving component 5 includes gear 51 and eccentric shaft 52, the gear 51 is arranged through the eccentric shaft 52, the gear 51 can drive the eccentric shaft 52 to rotate, and the gear 51 is meshed with the impeller component 4, the impeller component 4 drives the gear 51 to rotate to ensure that the water outlet device can run smoothly under high or low pressure; The bottom end of the eccentric shaft 52 is provided with a convex column 52*a*, the convex column 52*a* is matched with the sliding groove 311 of the swing surface cover to drive the swing water component to swing; One end of the eccentric shaft 52 is installed on the inclined water body 2, and the other end passes through the base 1 and fits with the swing surface cover to drive the swing water assembly to swing left and right. Preferably, the eccentric shaft 52 is provided with a scaling washer b3, the base 1 is provided with a sink 12, the scaling washer B3 is placed in the sink 12 and is matched with the base 1 for sealing, the sealing washer B3 is a special-shaped O-ring.

Figure 3:
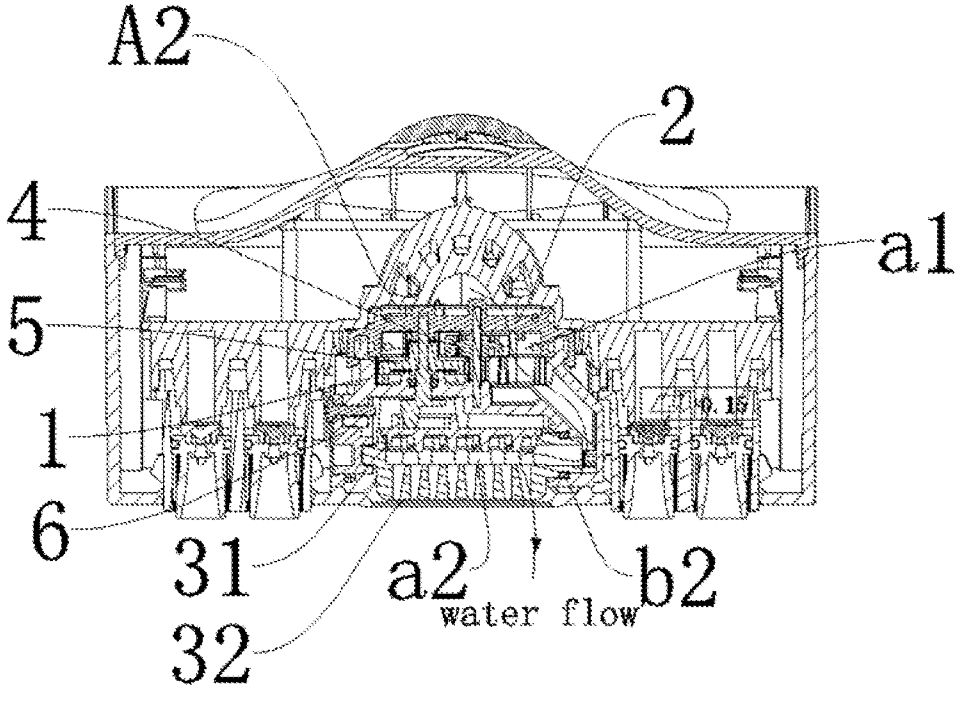
FIG. 3 is Section D-D in FIG. 2.
Figure 4:
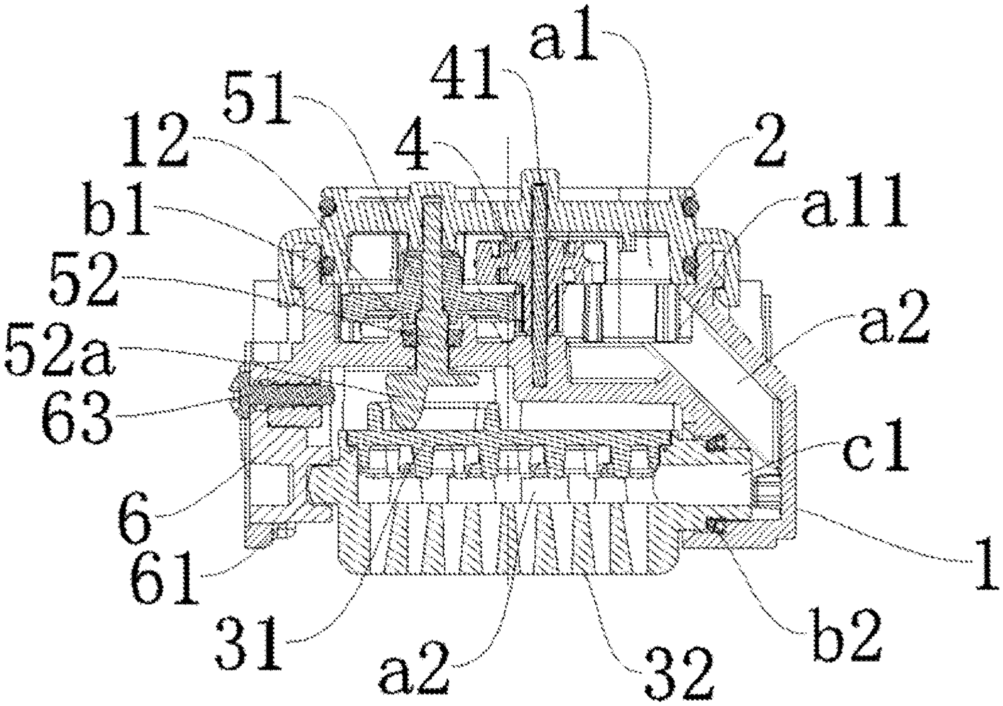
FIG. 4 is a sectional view of the water outlet device of the utility model.
Figure 5:
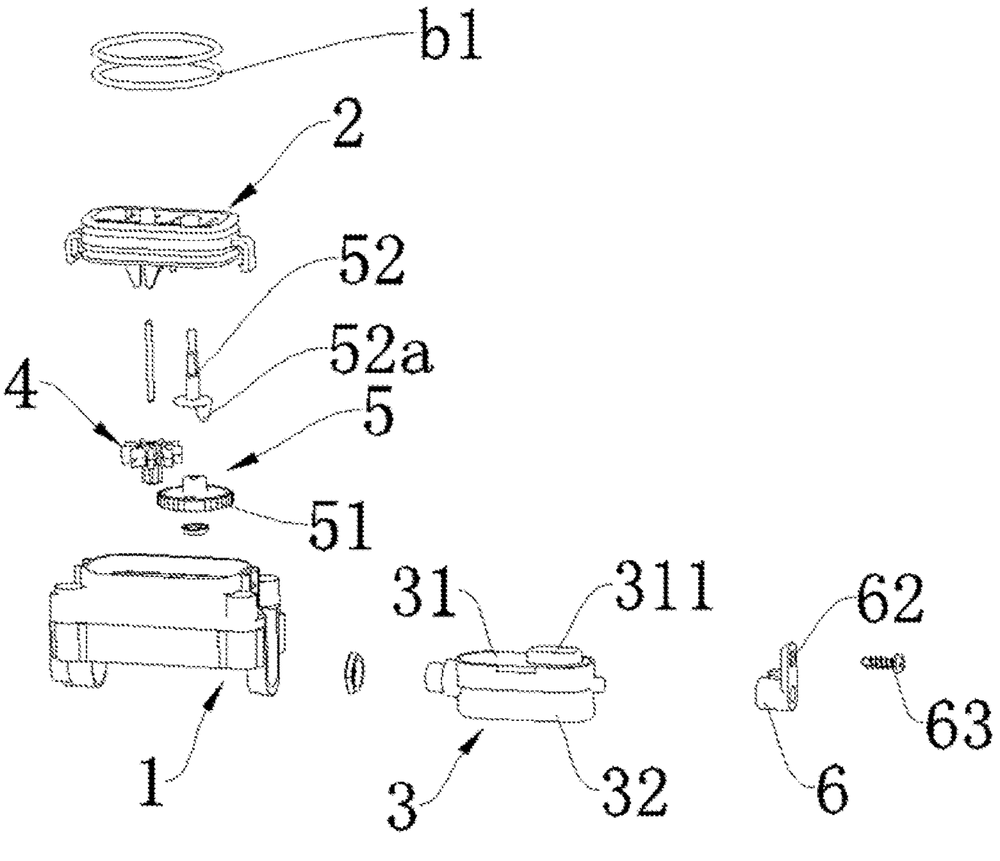
FIGS. 5 and 6 are the breakdown diagrams of the utility model.
Figure 6:
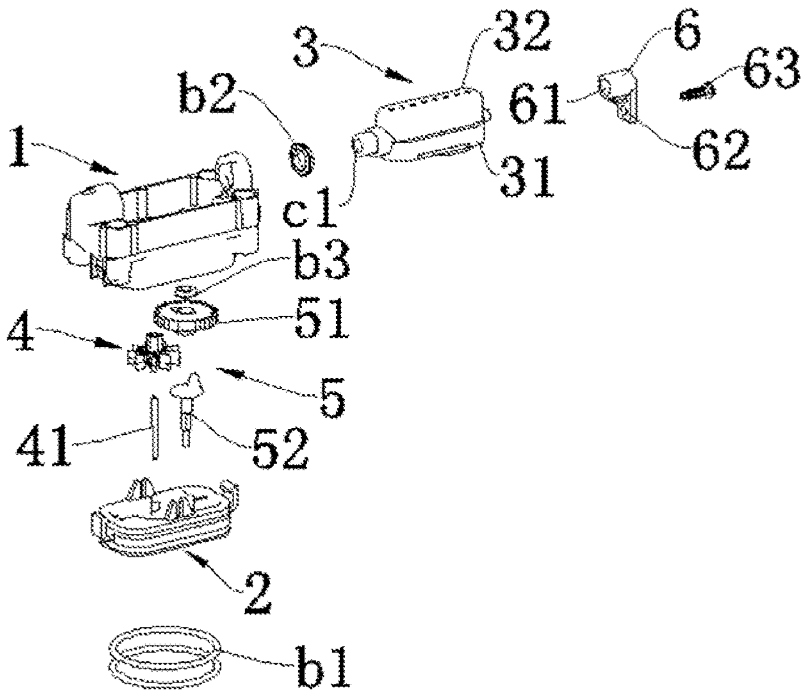

Specifically, refer to FIG. 3, when the water flows into the cavity A1 from the inclined water hole of the inclined water body 2, it can impact the impeller component 4, the impeller component 4 is matched with the gear 51 to drive the eccentric shaft 52 to rotate, the convex column 52*a* at the bottom end of the eccentric shall 52 cooperates with the chute 311 of the swing surface cover to drive the swing water assembly 3 to swing, forming a sweeping effect, thus, the water holes can be sprayed out in turn to form swinging water spray, which makes the user have a sweeping impact massage feeling when using.

The above description shows and describes preferred embodiments of the utility model. As mentioned above, it should be understood that the utility model is not limited to the form disclosed herein, and should not be regarded as the exclusion of other embodiments, but can be used in various other combinations, modifications and environments, and can pass the above teaching or technology or knowledge in related fields within the scope of the utility model concept described herein We need to make changes.

What is claimed is:

1. An energy saving dynamic effluent sprinkler, comprises a shell, a water inlet seat, a water outlet device and a water outlet cover, the water outlet device is arranged in the shell, the water outlet cover is connected with the shell, and the water outlet cover is provided with a water outlet hole; the water outlet device comprises a base, an inclined water body, a swing water component, an impeller component and a driving component, the inclined water body is connected with the base to form a cavity, the cavity has a water outlet, the impeller component is arranged in the cavity, driven by the impeller component, the driving component can drive the swing water component to swing back and forth; The swing water component is mounted on the base and can swing in the base, the swing component is provided with a water passing chamber, in the side surface of the swing component is provided with a water passing outlet, the water outlet is communicated with water passing outlet through a communication channel, and the swing water component is communicated with the water outlet hole;

the water passing outlet and the water outlet are located in a non-parallel plane;

the swing water component comprises a swing surface cover and a swing water nozzle, the swing surface cover and the swing water nozzle are mutually sealed and fixed to form the water passing chamber, the swing water nozzle is communicated with the water outlet hole;

the driving component comprises a gear and an eccentric shaft, the gear is meshed with the impeller component, the bottom end of the eccentric shaft is provided with a convex column; the upper surface of the swing surface cover is provided with a chute, the convex column is matched with the chute to drive the swing water component to swing back and forth;

the outer side of the water passing outlet is sheathed with a sealing ring;

a circumferential direction of the sealing ring is consistent with the swing direction of the swing water component;

the center of the impeller component uses a pin to install the impeller component in the cavity, one end of the pin is installed on the inclined water body, and the other end is installed on the base, the impeller component can rotate around the pin under the impact of the water flowing into the inclined water hole; the gear is arranged through the eccentric shaft, the gear can drive the eccentric shaft to rotate; when the water flows into the cavity from the inclined water hole of the inclined water body, the impeller component can rotate around the pin under the impact of the water, and the impeller component rotates the gears, and the gears rotate the eccentric shaft, the convex column at the bottom end of the eccentric shaft cooperates with the chute of the swing surface cover to drive the swing water assembly to swing;

the communication channel is an inclined channel.

2. The energy saving dynamic effluent sprinkler to claim 1, comprises the sealing ring is a O-ring.

3. The energy saving dynamic effluent sprinkler to claim 1, comprises the water outlet hole at least includes a first water outlet hole and a second water outlet hole, and the first water outlet hole is communicated with the water passing chamber.

4. The energy saving dynamic effluent sprinkler to claim 1, comprises one end of the swing water component with the water outlet is connected with the base, and the other end is fixed on the base by a fixing plug.

5. The energy saving dynamic effluent sprinkler to claim 1, comprises the cavity is located above the swing water component, and the water passing outlet is arranged on the side of the swing water component.

* * * * *